(12) United States Patent
Smihal

(10) Patent No.: US 7,390,265 B2
(45) Date of Patent: Jun. 24, 2008

(54) FLEXIBLE COUPLING DEVICE

(75) Inventor: John D. Smihal, Mechanicsburg, PA (US)

(73) Assignee: TB Wood's Enterprises, Inc., Wilmington, DE (US)

( * ) Notice: Subject to any disclaimer, the term of this patent is extended or adjusted under 35 U.S.C. 154(b) by 292 days.

(21) Appl. No.: 11/256,463

(22) Filed: Oct. 21, 2005

(65) Prior Publication Data

US 2007/0099712 A1    May 3, 2007

(51) Int. Cl.
    *F16D 3/54* (2006.01)
(52) U.S. Cl. .......................... 464/80; 464/88
(58) Field of Classification Search ............. 464/49, 464/75, 80, 88, 89, 91
    See application file for complete search history.

(56) References Cited

U.S. PATENT DOCUMENTS

| 1,646,427 A | * | 10/1927 | Skidmore, Jr. ............ 464/88 X |
| 2,186,305 A |   | 1/1940  | Orr |
| 2,587,365 A |   | 2/1952  | Mize |
| 2,867,103 A | * | 1/1959  | Williams ................... 464/88 |
| 3,137,149 A |   | 6/1964  | Schlotmann |
| 3,385,080 A | * | 5/1968  | Sorenson .................. 464/49 |
| 3,524,332 A | * | 8/1970  | Callies .................... 464/80 |
| 3,626,767 A |   | 12/1971 | Wildi |
| 3,635,049 A | * | 1/1972  | Schlotmann et al. ......... 464/80 |
| 3,874,194 A |   | 4/1975  | Filepp et al. |
| 4,473,359 A |   | 9/1984  | Davis |
| 4,789,376 A |   | 12/1988 | Grant |
| 5,660,591 A |   | 8/1997  | Reynolds |
| 6,080,065 A |   | 6/2000  | Hindman et al. |
| 6,196,926 B1 |  | 3/2001  | Goebel et al. |
| 6,257,985 B1 |  | 7/2001  | Ward et al. |
| 6,342,011 B1 |  | 1/2002  | Pokrandt et al. |

* cited by examiner

*Primary Examiner*—Greg Binda
(74) *Attorney, Agent, or Firm*—Dykema Gossett PLLC

(57) ABSTRACT

A flexible coupling device for mounting on axially opposed rotatable shafts comprises a pair of opposing hubs, a flexible connecting sleeve, and a pair of opposing retainers. Each of the hubs has a plurality of hub engaging elements extending there from. The flexible connecting sleeve has a plurality of internal sleeve engaging elements extending there from that mate with the hub engaging elements and a plurality of external sleeve engaging elements extending there from. The retainers are removeably attached to the hubs. Each of the retainers has an internal flange that engages the external sleeve engaging elements to restrict movement of the connecting sleeve relative to the hubs and the retainers.

36 Claims, 10 Drawing Sheets

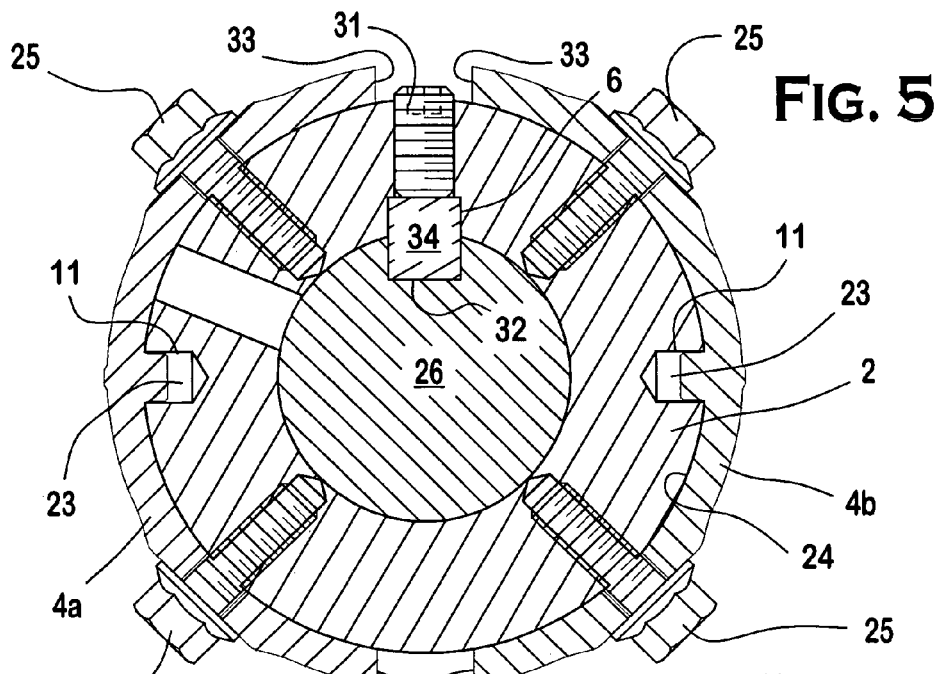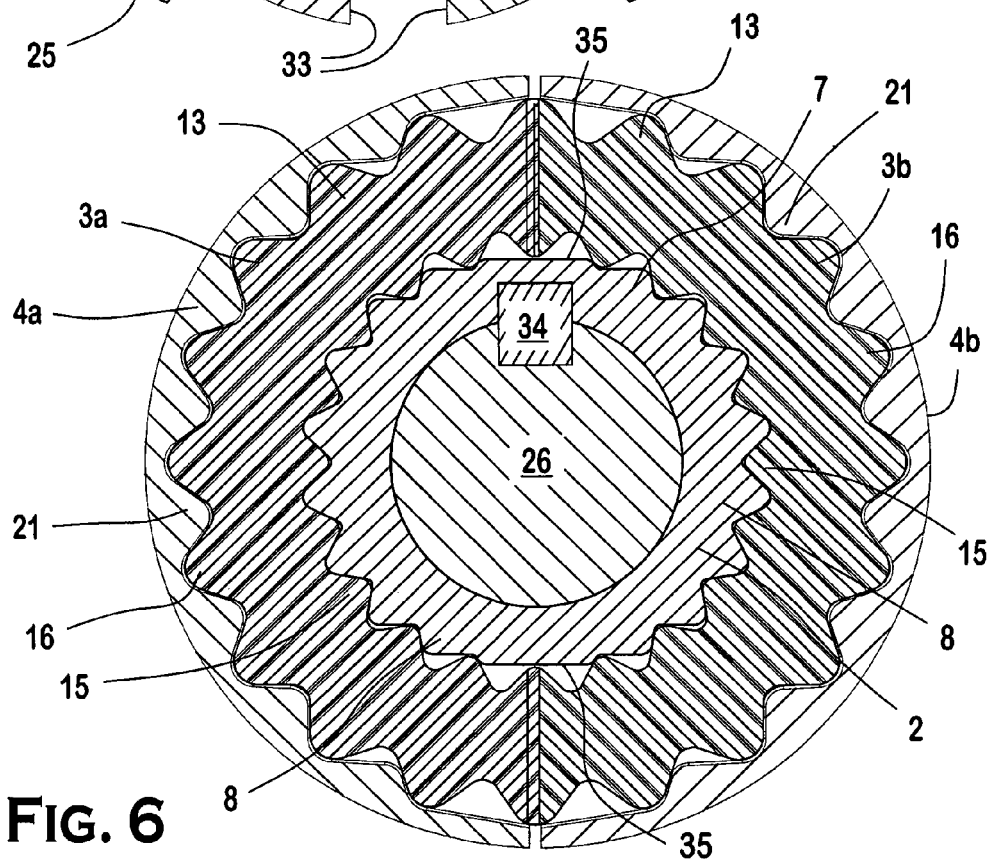

FLEXIBLE COUPLING DEVICE

FIELD OF THE INVENTION

The invention generally relates to a flexible coupling device and, more particularly, to a flexible coupling device used to transmit torque between axially opposed rotatable shafts.

BACKGROUND OF THE INVENTION

In one common type of flexible coupling device, opposing hubs are arranged on ends of two axially opposed rotatable shafts. A flexible connecting sleeve axially extends between the hubs. The hubs have an annular recess provided with a plurality of internal and external engaging elements. The connecting sleeve is provided with a plurality of engaging elements similar in size and shape to the engaging elements on the hubs. When assembled, the engaging elements of the connecting member mate with the engaging elements on the hubs to provide a path for torque transmission.

Under high torque load conditions, the engaging elements on the hubs tend to interlock with the engaging elements on the connecting sleeve. The interlocking of the engaging elements on the hubs and the engaging elements on the connecting sleeve prohibits the connecting sleeve from moving relative to the hubs. When the flexible coupling device is subjected to lighter torque loads, as are often encountered in modem centrifugal pump applications using variable frequency drives, however, the engaging elements on the hubs do not properly interlock with the engaging elements on the connecting sleeve. As a result, the engaging elements on the connecting sleeve tend to slide relative to the engaging elements on the hubs. This relative sliding motion can cause wear on the engaging elements on the connecting sleeve, which will negatively effect the operation of the flexible coupling device.

Additionally, in order to replace the connecting sleeve, the hubs must be moved away from the connecting sleeve down the length of the shaft in an axial direction. Not only does this type of replacement unnecessarily disturb the connection between the hubs and the shafts, but it is also difficult and time consuming to slide the hubs down the shaft after the flexible coupling device has been in use for a prolonged period of time due to shaft corrosion, debris, or the like.

SUMMARY OF THE INVENTION

The invention relates to a flexible coupling device for mounting on axially opposed rotatable shafts comprising a pair of opposing hubs, a flexible connecting sleeve, and a pair of opposing retainers. Each of the hubs has a plurality of hub engaging elements extending there from. The connecting sleeve has a plurality of internal sleeve engaging elements extending there from and a plurality of external sleeve engaging elements extending there from. The internal sleeve engaging elements mate with the hub engaging elements. The connecting sleeve is separable into separate sleeve halves. Each of the retainers has an internal and external flange that form a connecting sleeve receiving opening. Each of the retainers has a plurality of retainer engaging elements extending there from that mate with the external sleeve engaging elements that are received in the connecting sleeve receiving opening. Each of the retainers is separable into separate retainer halves.

The invention further relates to a flexible coupling device for mounting on axially opposed rotatable shafts comprising a pair of opposing hubs, a flexible connecting sleeve, and a pair of opposing retainers. Each of the hubs has a plurality of hub engaging elements extending there from. The connecting sleeve has a plurality of internal sleeve engaging elements extending there from and a plurality of external sleeve engaging elements extending there from. The internal sleeve engaging elements mate with the hub engaging elements. Each of the retainers has a plurality of retainer engaging elements extending there from that mate with the external sleeve engaging elements. External and internal flanges define a connecting sleeve receiving opening. The external sleeve engaging elements are positioned in the connecting sleeve receiving opening.

The invention still further relates to a flexible coupling device for mounting on axially opposed rotatable shafts comprising a pair of opposing hubs, a flexible connecting sleeve, and a pair of opposing retainers. Each of the hubs has a plurality of hub engaging elements extending there from. The flexible connecting sleeve has a plurality of internal sleeve engaging elements extending there from that mate with the hub engaging elements and a plurality of external sleeve engaging elements extending there from. The retainers are removeably attached to the hubs. Each of the retainers has an internal flange that engages the external sleeve engaging elements to restrict movement of the connecting sleeve relative to the hubs and the retainers.

BRIEF DESCRIPTION OF THE DRAWINGS

FIG. 5 is a sectional view taken along line 5-5 of FIG. 2;

FIG. 6 is a sectional view taken along line 6-6 of FIG. 2;

DETAILED DESCRIPTION OF THE INVENTION

Figure 1:
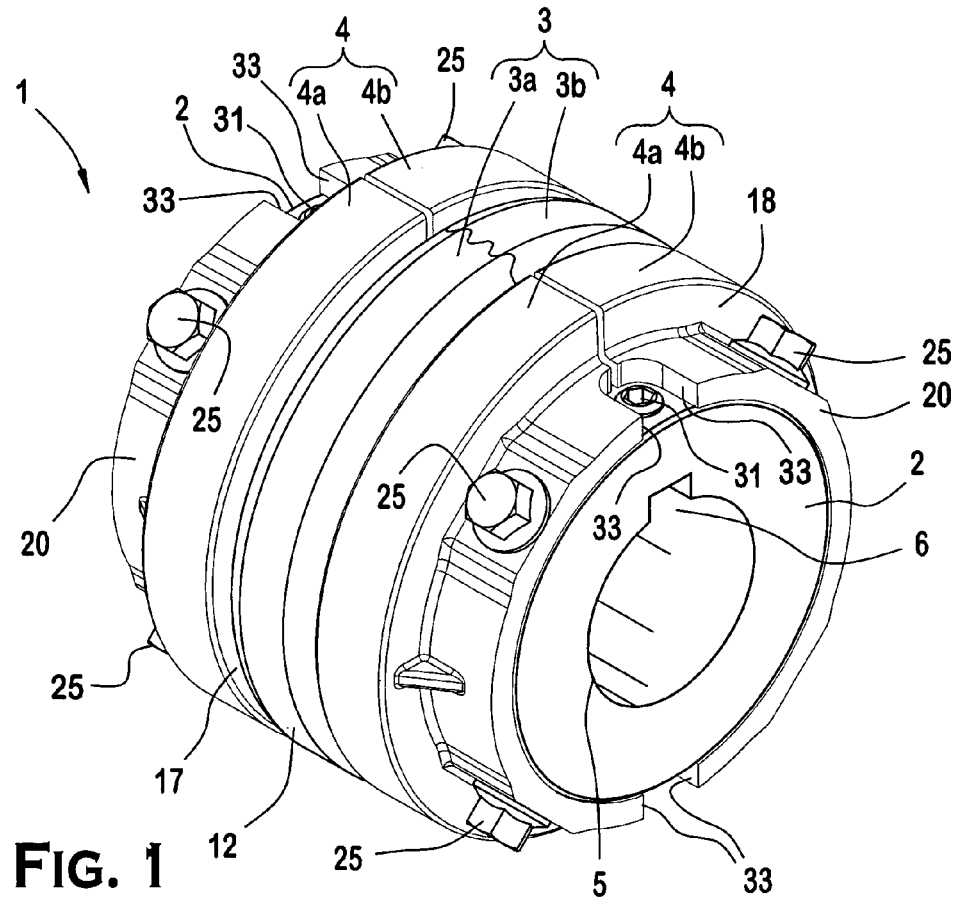
FIG. 1 is a perspective view of a flexible coupling device according to a first embodiment of the invention.
Figure 3:
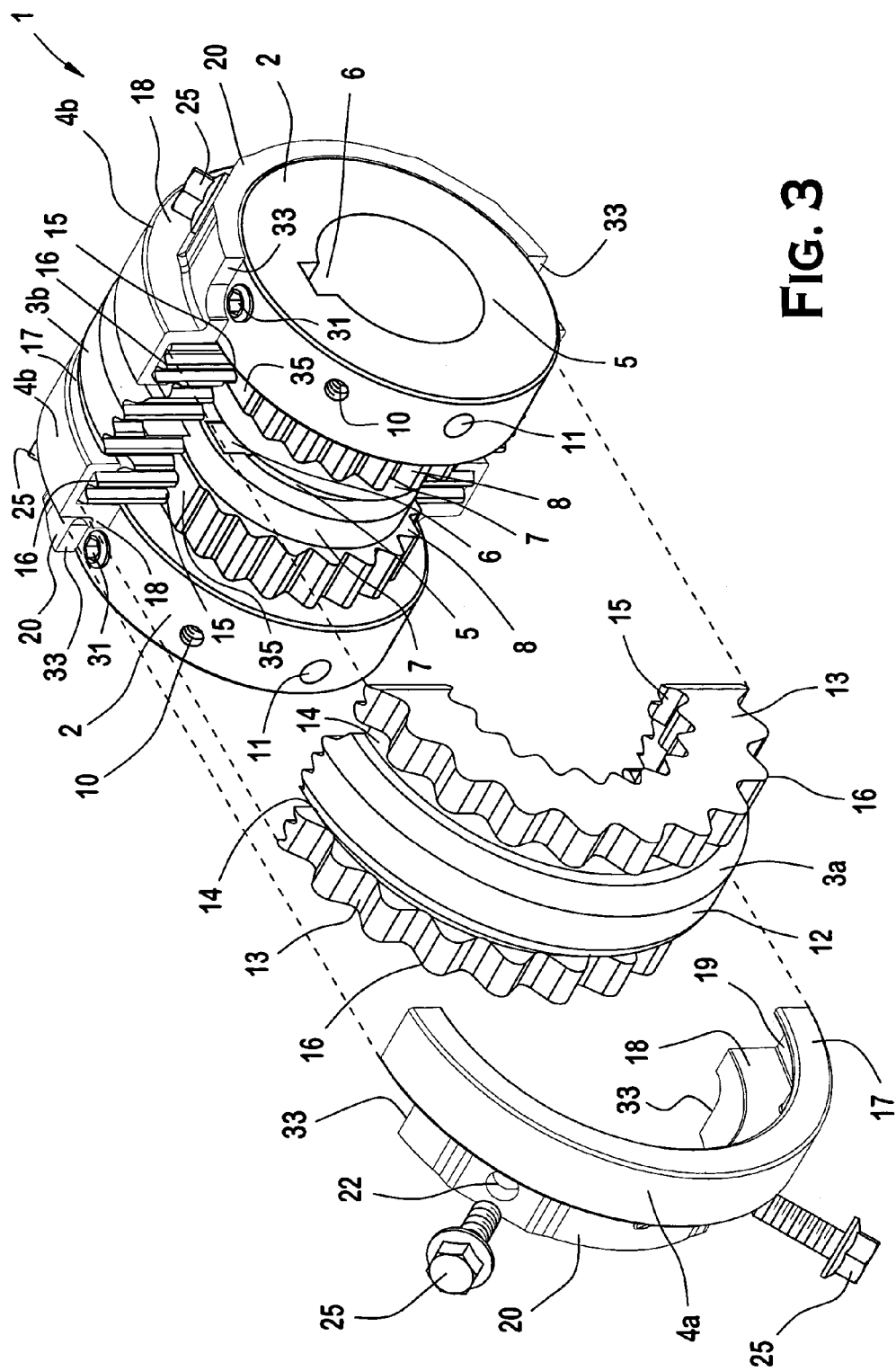
FIG. 3 is a partial exploded view of the flexible coupling device of FIG. 1 taken from a first side thereof.
Figure 4:
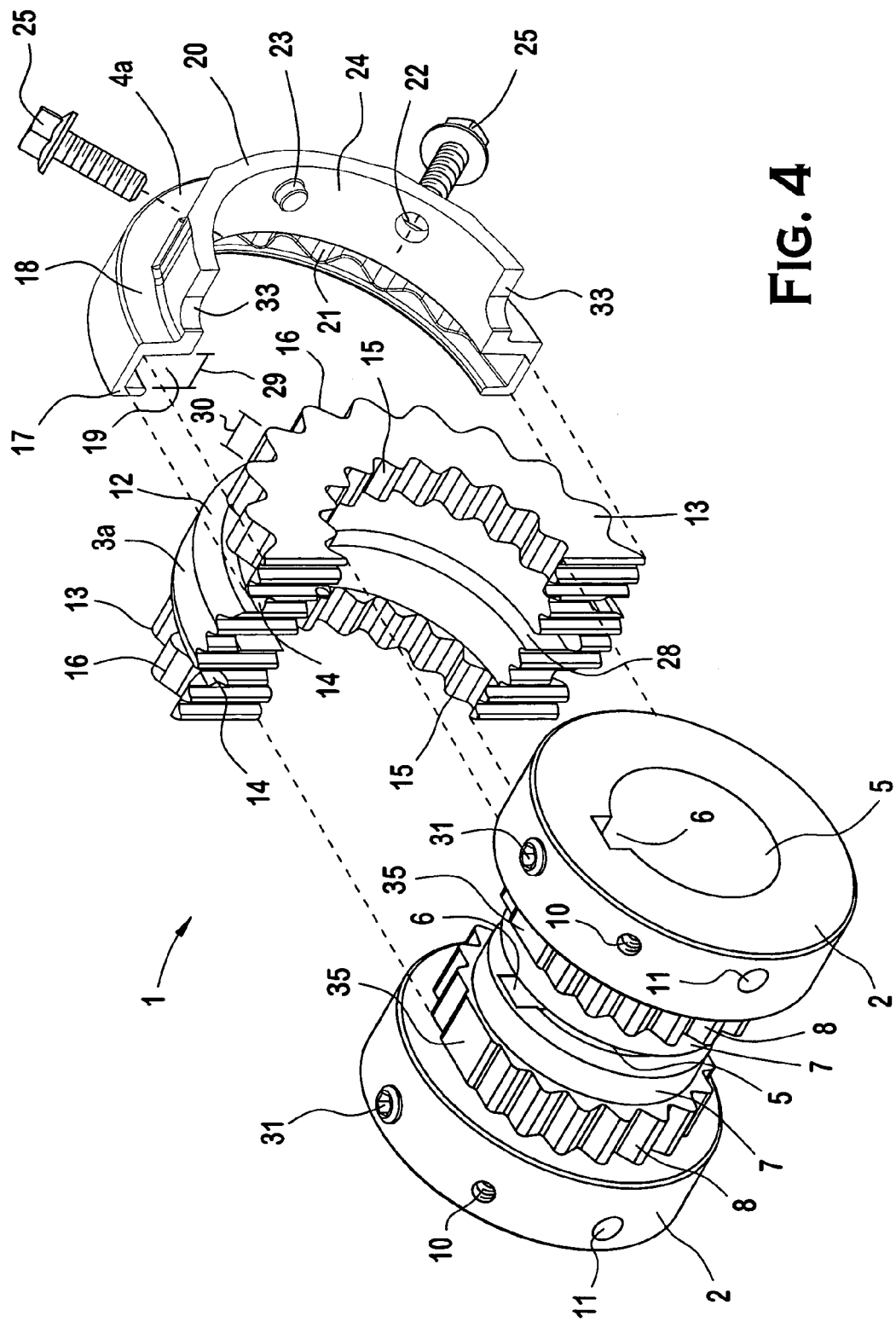
FIG. 4 is a partial exploded view of the flexible coupling device of FIG. 1 taken from a second side thereof.

FIGS. 18 show a flexible coupling device 1 according to a first embodiment of the invention. As shown in FIG. 1, the flexible coupling device 1 comprises a pair of opposing hubs 2, a flexible connecting sleeve 3, and a pair of opposing retainers 4. As shown in FIGS. 3-4, a bore 5 extends through each of the hubs 2. Each of the bores 5 is provided with a hub keyway 6. Each of the hubs 2 includes an inner extension 7. Each of the inner extensions 7 has a smaller diameter than a diameter of the remainder of the hubs 2. A plurality of hub engaging elements 8 extend in a radial direction from an inner periphery of the inner extensions 7. Alternatively, the hubs 2 may be formed without the inner extensions 7 and hub engaging elements 8 may be directly attached to the hubs 2. The hub engaging elements 8 may, for example, be formed as teeth. The hub engaging elements 8 may be formed to have modified sections 35. Hub securing members 31 extend through each of the hubs 2 and communicate with the hub keyway 6. Each of the hubs 2 has attachment member receiving through-holes 10 and alignment apertures 11 formed in an outer periphery thereof. The attachment member receiving through-holes 10 may be threaded for receipt of an attachment member 25, such as a cap screw. It will be appreciated by those skilled in the art, however, that other conventional attachment members and/or methods of attachment may be used, such as retaining clips, clamping rings, etc.

Figure 8:
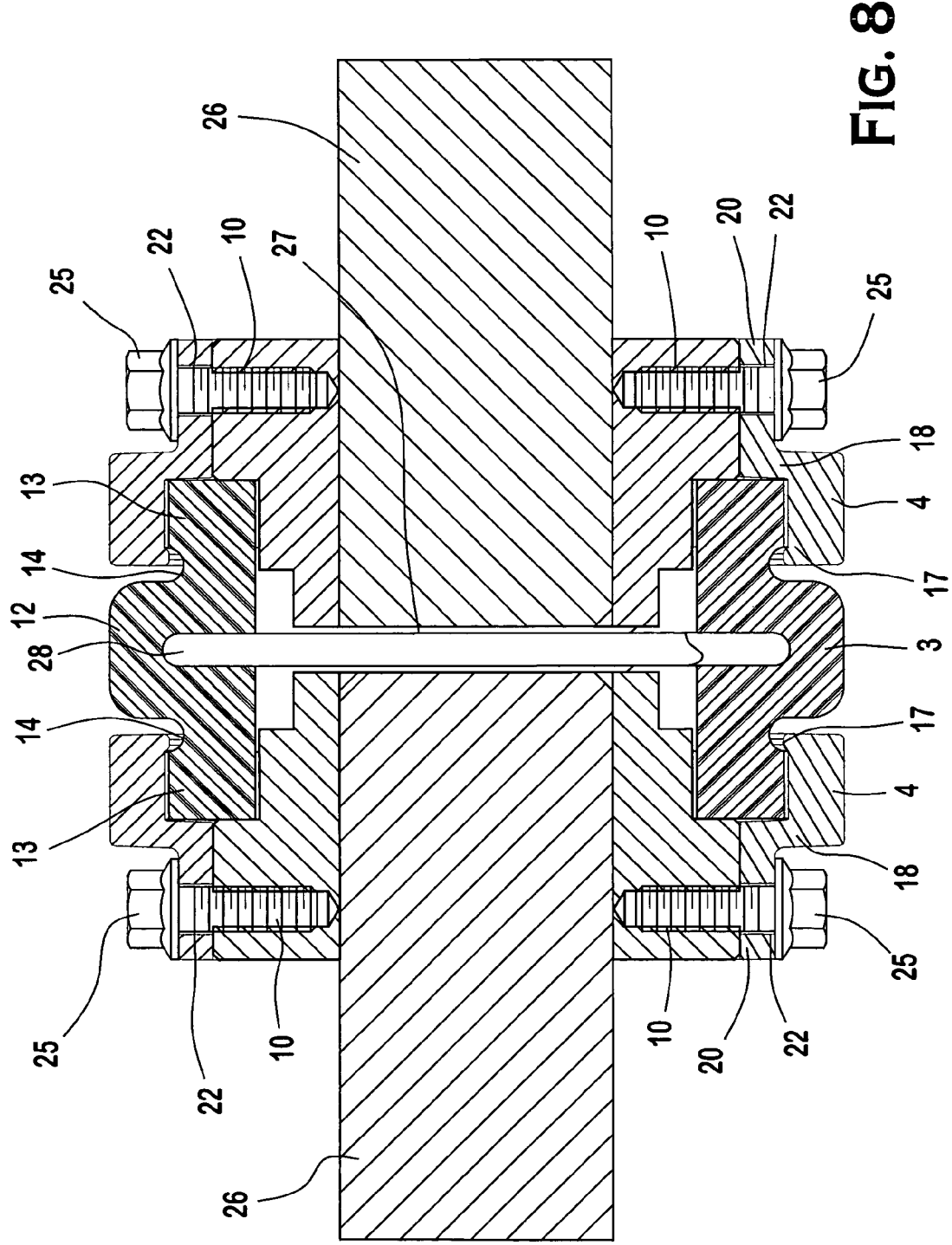
FIG. 8 is a sectional view taken along line 8-8 of FIG. 2.

As shown in FIG. 3, the connecting sleeve 3 has a substantially annular configuration and is separable into separate sleeve halves 3a, 3b. Although in the illustrated embodiment the sleeve halves 3a, 3b are shown as being semi-annular, it will be appreciated by those skilled in the art that other configurations are possible. Alternatively, the connecting sleeve 3 may be formed with an axial slit (not shown). The connecting sleeve 3 consists of side elements 13 connected by a bridge 12, as shown in FIG. 8. The bridge 12 has an elongated opening 28 formed therein such that each of the sleeve halves 3a, 3b has a substantially u-shaped cross-section. Each of the side elements 13 has a smaller diameter than the bridge 12. A groove 14 is formed between the bridge 12 and each of the side elements 13. A plurality of internal sleeve engaging elements 15 that correspond to the hub engaging elements 8 extend in a radial direction from an internal surface of each of the side elements 13, as shown in FIG. 3. The internal sleeve engaging elements 15 may, for example, be formed as teeth. The internal sleeve engaging elements 15 are formed such that the connecting sleeve 3 may be easily removed from the hub engaging elements 8 in a radial direction. The internal sleeve engaging elements 15 and the hub engaging elements 8 may fit together, for example, with an interference fit or such that a slight amount of clearance is left there between. A plurality of external sleeve engaging elements 16 extend in a radial direction from an external surface of each of the side elements 13. The external sleeve engaging elements 16 may, for example, be formed as teeth. The external sleeve engaging elements 16 have a width 30, as shown in FIG. 4. The connecting sleeve 3 may be formed, for example, from an elastomeric material, such as a neoprene rubber, a polyurethane, a urethane blend, a thermoplastic material, ethylene-propylene-diene-monomer (EPDM), or any other suitable flexible material. It will be appreciated by those skilled in the art that the connecting sleeve 3 is not limited to the configuration described herein and that other configurations of the connecting element are possible within the scope and spirit of the invention.

Figure 2:
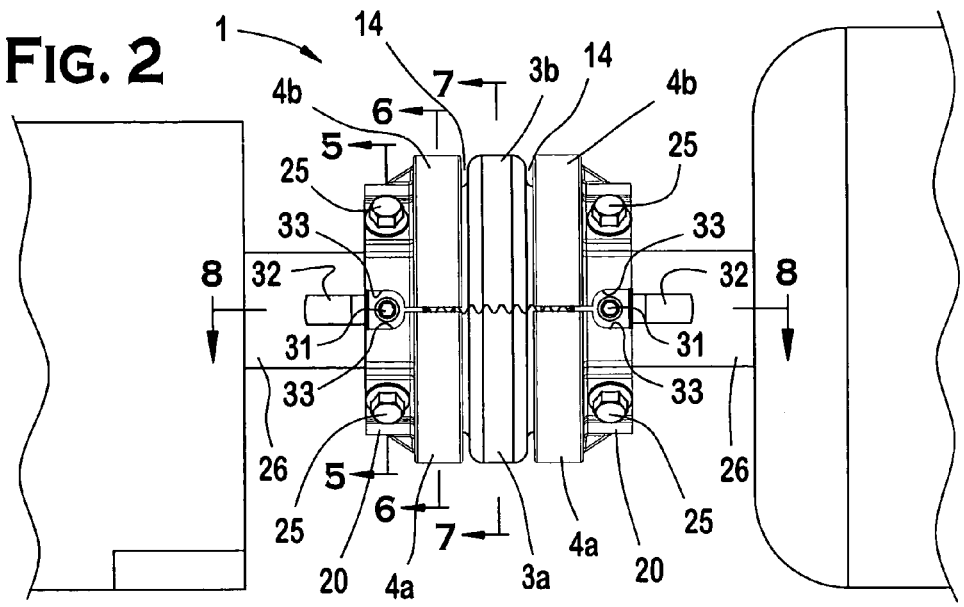
FIG. 2 is an elevated view of the flexible coupling device of FIG. 1 assembled to two axially spaced rotatable shafts.

As shown in FIGS. 2-3, each of the retainers 4 has a substantially annular configuration and is separable into separate retainer halves 4a, 4b. Although in the illustrated embodiment the retainer halves 4a, 4b are shown as being semi annular, it will be appreciated by those skilled in the art that other configurations are possible. As shown in FIG. 3, each of the retainers 4 has internal and external flanges 17, 18, respectively, that form a connecting sleeve receiving opening 19. It will be appreciated by those skilled in the art, however, that the internal and external flanges 17, 18 could be formed on elements of the flexible coupling device 1 other than the retainers 4. For example, the internal flanges 17 could be formed on the retainers 4, and the external flanges 18 could be formed on the hubs 2. The internal and external flanges 17, 18 are spaced apart by a width 29 approximately the same as the width 30 of the external sleeve engaging elements 16, as shown in FIG. 4, such that axial movement of the external sleeve engaging elements 16 is limited. A plurality of retainer engaging elements 21 that correspond to the external sleeve engaging elements 16 extend in a radial direction from the connecting sleeve receiving openings 19, as shown in FIG. 4. The retainer engaging elements 21 may, for example, be formed as teeth. The retainer engaging elements 21 are formed such that the retainer halves 4a, 4b may be easily removed from the external sleeve engaging elements 16 in a radial direction. The retainer engaging elements 21 and the external sleeve engaging elements 16 may fit together, for example, with an interference fit or such that a slight amount of clearance is left there between. A collar 20 extends from each of the external flanges 18. The collar 20 is provided with attachment member receiving through-holes 22 that correspond to the attachment member receiving through-holes 10 of the hubs 2. The attachment member receiving through-holes 22 may be threaded for receipt of the attachment members 25. It will be appreciated by those skilled in the art, however, that other conventional attachment members and/or methods of attachment may be used, such as retaining clips, etc. Alignment dowels 23 project from an internal surface 24 of the collars 20. The alignment dowels 23 correspond to the alignment apertures 11 in the hubs 2. Each of the retainer halves 4a, 4b has a cutout 33 corresponding to the hub securing members 31 formed on an end thereof. The retainers 4 may be formed, for example, from a metal or plastic material.

As shown in FIG. 2, each of the hubs 2 is secured to a rotatable shaft 26. Each of the rotatable shafts 26 has a shaft keyway 32 that correspond to the hub keyway 6 in the hubs 2. A key 34 is received in the shaft keyway 32 and the hub keyway 6, as shown in FIG. 5. The key 34 causes the hub 2 to be secured to the rotatable shaft 26 during rotation. The hub securing members 31 engage the keys 34. The hub securing members 31 force the keys 34 against the rotatable shafts 26 to prevent the hubs 2 from sliding along the rotatable shafts 26. The rotatable shafts 26 are secured such that a space 27 is left there between, as shown in FIG. 8. It will be appreciated by those skilled in the art that attachment of the rotatable shafts 26 to the hubs 2 is not limited to the method described herein and that other methods of attachment are possible within the scope and spirit of the invention.

Figure 7:
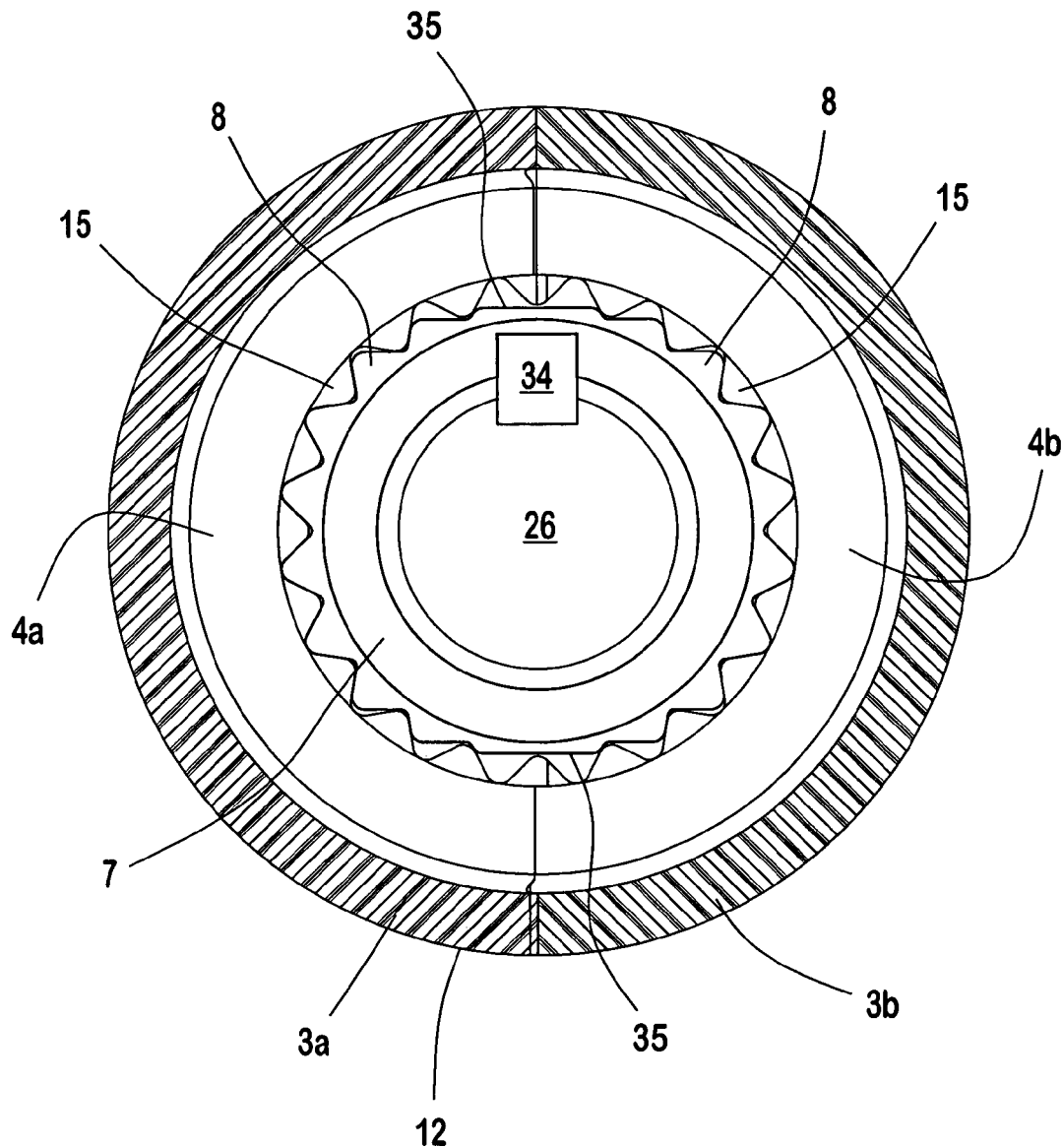
FIG. 7 is a sectional view taken along line 7-7 of FIG. 2.

The sleeve halves 3a, 3b of the connecting sleeve 3 are positioned on the hubs 2 such that the internal sleeve engaging elements 15 mate with the hub engaging elements 8 with an interference fit or slight clearance fit, as shown in FIGS. 6-7. The retainer halves 4a, 4b of the retainers 4 are positioned on the connecting sleeve 3 such that the alignment dowels 23 that project from the internal surface 24 of the collars 20 are received in the alignment apertures 11 in the hubs 2 and the internal flanges 17 are received in the grooves 14 between the bridge 12 and the side elements 13, as shown in FIGS. 5 and 8. In this position, the retainer engaging elements 21 mate with the external sleeve engaging elements 16, as shown in FIGS. 3 and 6. The external sleeve engaging elements 16 are arranged in the connecting sleeve receiving opening 19 between the internal and external flanges 17, 18. Because each of the retainers 4 is provided with the internal and external flanges 17, 18 spaced apart by the width 29, which is approximately the same as the width 30 of the external sleeve engaging elements 16, the internal and external flanges 17, 18 restrict the axial movement of the connecting sleeve 3 relative to the hubs 2 and the retainers 4. The attachment members 25 are inserted into the attachment member receiving through-holes 22 of the retainers 4 and the attachment member receiving through-holes 10 of the hubs 2 to secure the retainers 4 and thus the connecting sleeve 3 to the hubs 2.

To replace the connecting sleeve 3, the retainer halves 4a, 4b of the retainers 4 are removed from the hubs 2 by removing the attachment members 25. The sleeve halves 3a, 3b of the connecting sleeve 3 are then removed from the hubs 2. A new connecting sleeve 3 is positioned on the hubs 2 such that the internal sleeve engaging elements 15 mate with the hub engaging elements 8. The retainer halves 4a, 4b of the retainers 4 are then re-positioned on the hubs 2 such that the retainer engaging elements 21 mate with the external sleeve engaging elements 16 of the new connecting sleeve 3. The retainer halves 4a, 4b are re-attached to the hubs 2 by the attachment members 25.

Because each of the pairs of retainers 4 are separable into the retainer halves 4a, 4b, and the connecting sleeve 3 is separable into the sleeve halves 3a, 3b, the connecting sleeve 3 in the flexible coupling device 1 may be easily replaced by removing the attachment members 25 and the retainers 4. The connecting sleeve 3 can therefore be replaced without having to slide the hubs 2 in an axial direction along the shaft 26. As a result, the attachment between the hubs 2 and the shafts 26 is not disturbed during the replacement of the connecting sleeve 3. Additionally, because each of the retainers 4 is provided with the internal and external flanges 17, 18 spaced apart by the width 29, which is approximately the same as the width 30 of the external sleeve engaging elements 16, the internal and external flanges 17, 18 restrict the axial movement of the connecting sleeve 3 relative to the hubs 2 and the retainers 4. Also, the engagement between the internal engaging elements 15 and the hub engaging elements 8 and the external engaging elements 16 and the retainer engaging elements 21 further restricts the axial movement of the connecting sleeve 3 relative to the hubs 2 and the retainers 4. By restricting the movement of the connecting sleeve 3 relative to the hubs 2 and the retainers 4, excess wear due to misalignment and light torque loads is reduced and/or eliminated.

Figures 9, 10:
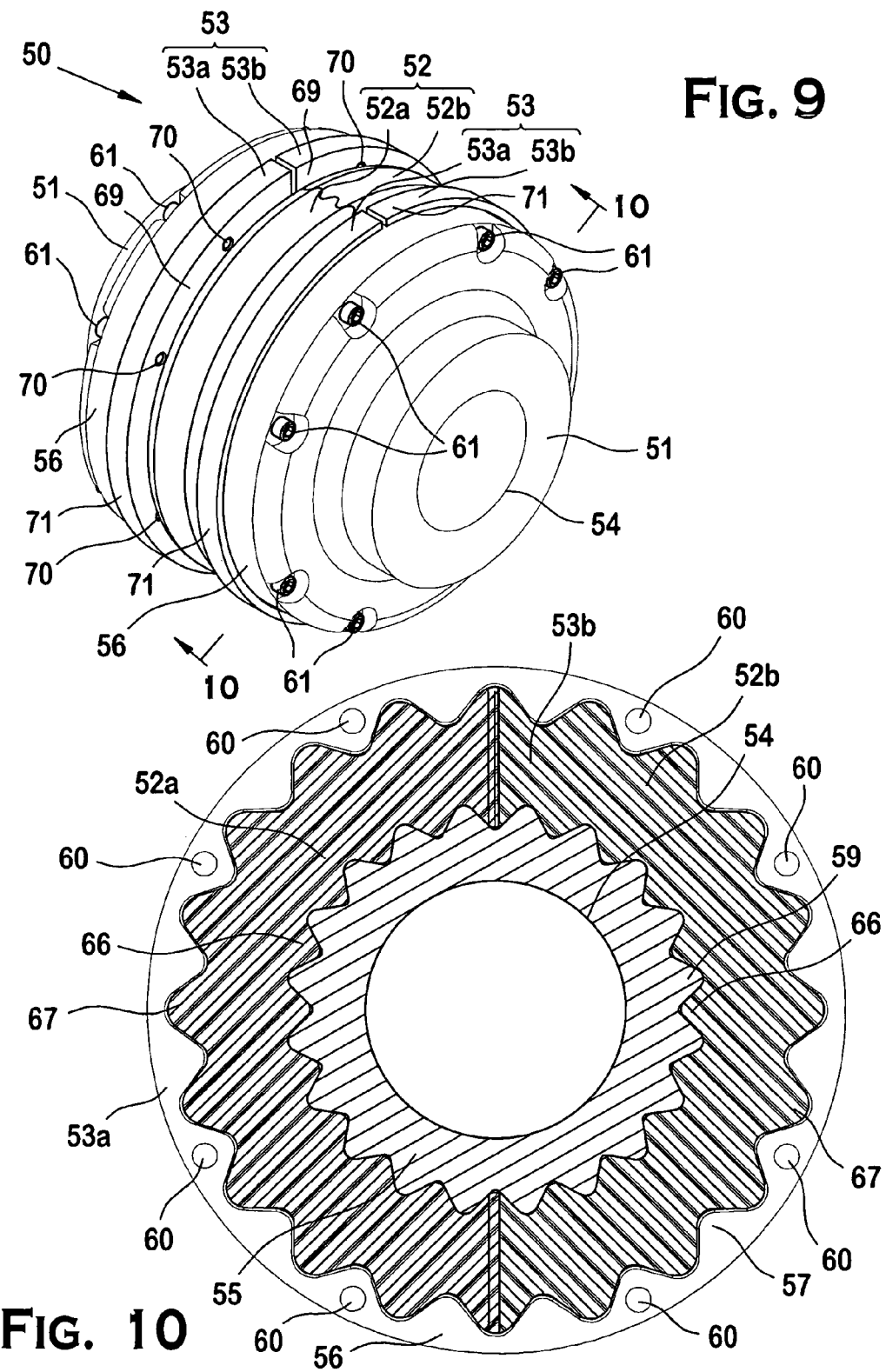
FIG. 9 is a perspective view of a flexible coupling device according to a second embodiment of the invention.
FIG. 10 is a sectional view taken along line 10-10 of FIG. 9.
Figure 11:
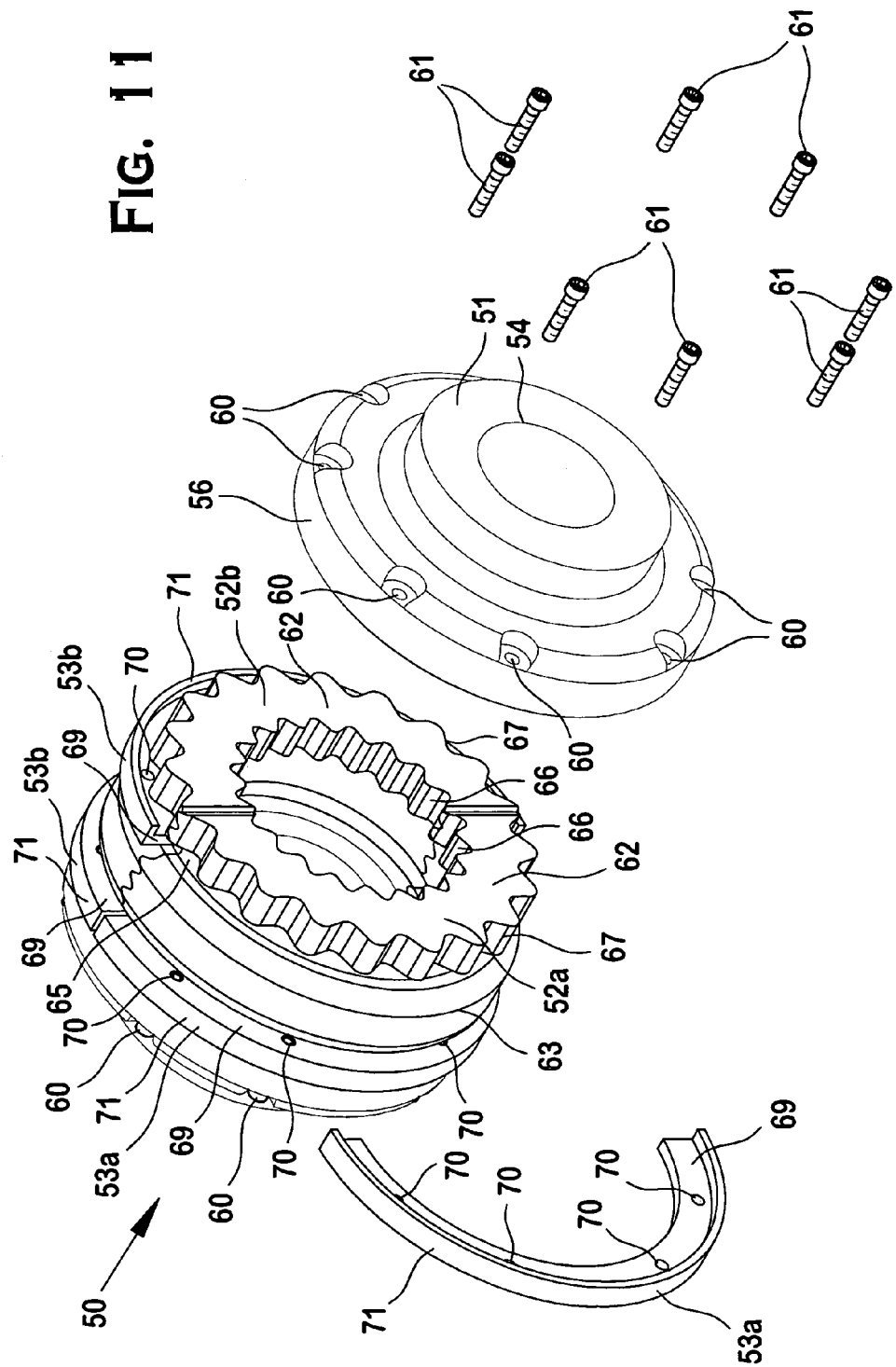
FIG. 11 is a partial exploded view of the flexible coupling device of FIG. 9 taken from a first side thereof.
Figure 12:
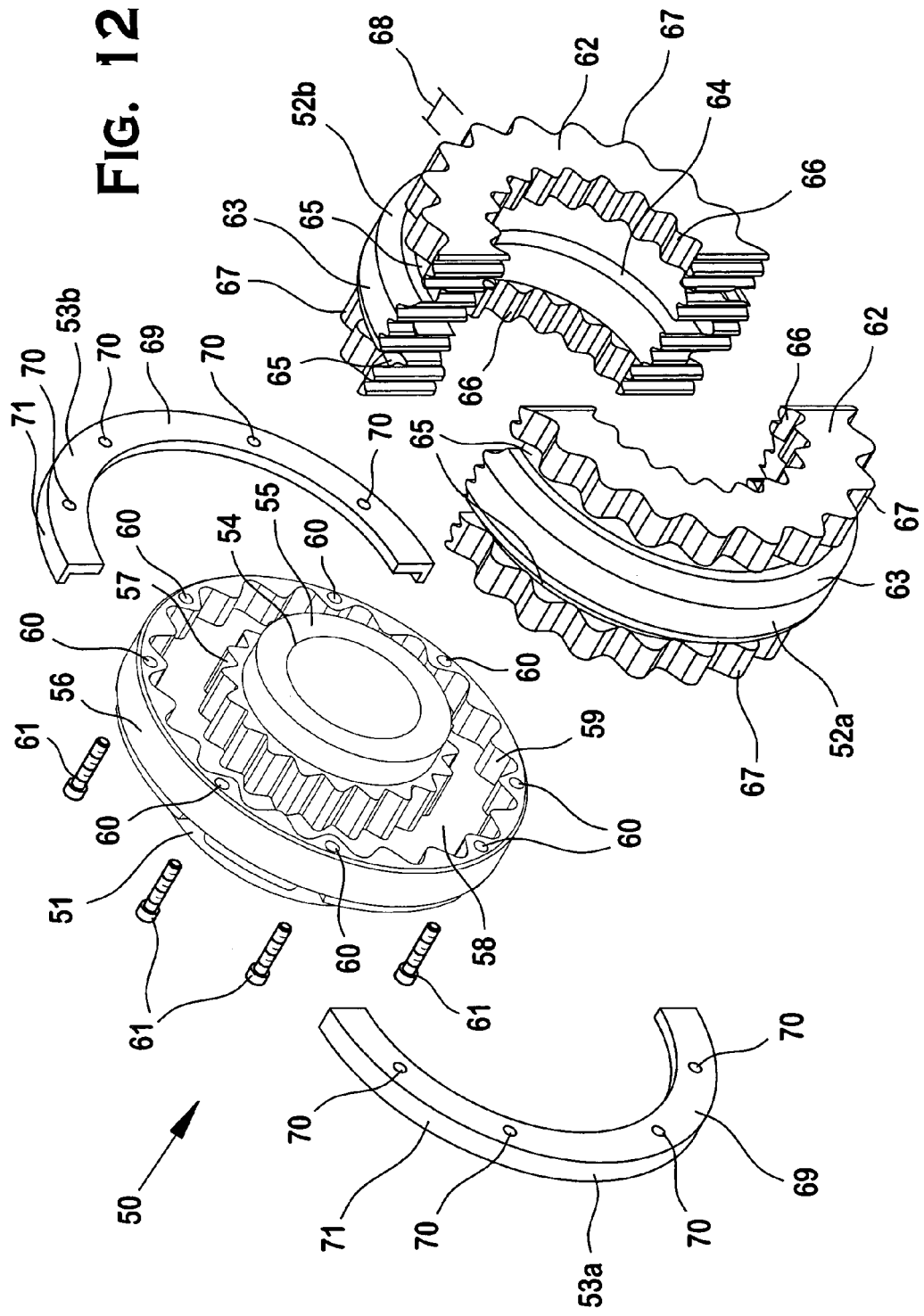
FIG. 12 is a partial exploded view of the flexible coupling device of FIG. 9 taken from a second side thereof.

FIGS. 9-13 show a flexible coupling device 50 according to a second embodiment of the invention. As shown in FIG. 9, the flexible coupling device 50 comprises a pair of opposing hubs 51, a flexible connecting sleeve 52, and a pair of opposing retainers 53. A bore 54 extends through each of the hubs 51. Each of the bores 54 may be provided with a hub keyway (not shown). As shown in FIG. 12, each of the hubs 51 includes an inner extension 55 and an outer extension 56. Each of the inner extensions 55 has a smaller diameter than a diameter of the outer extensions 56. The inner extension 55 is spaced from the outer extension 56 such that a connecting sleeve receiving opening 58 is formed there between. A plurality of hub engaging elements 57 extend in a radial direction from an inner periphery of the inner extensions 55. A plurality of second hub engaging elements 59 extend in a radial direction from an inner periphery of the outer extensions 56 toward the hub engaging elements 57. The hub engaging elements 57 and/or the second hub engaging elements 59 may, for example, be formed as teeth. The hub engaging elements 57 and/or the second hub engaging elements 59 may additionally be formed to have modified sections (not shown). Each of the hubs 51 has attachment member receiving through-holes 60 formed in an outer periphery thereof. The attachment member receiving through-holes 60 may be threaded for receipt of an attachment member 61, such as a cap screw. It will be appreciated by those skilled in the art, however, that other conventional attachment members and/or methods of attachment may be used, such as retaining clips, clamping rings, etc.

Figure 13:
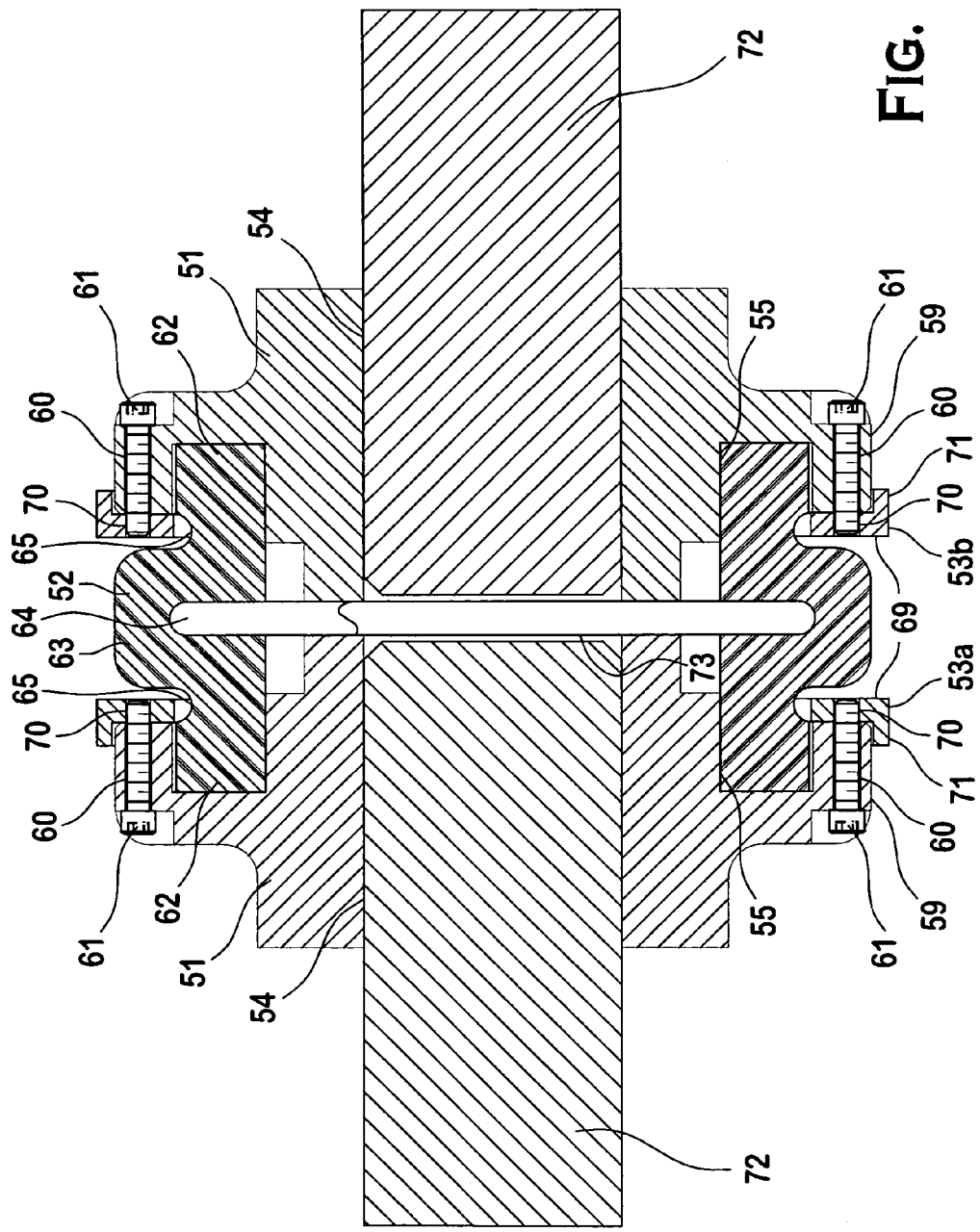
FIG. 13 is a sectional view of the flexible coupling device of FIG. 1 shown assembled to two axially spaced rotatable shafts.

As shown in FIGS. 9 and 12, the connecting sleeve 52 has a substantially annular configuration and is separable into separate sleeve halves 52a, 52b. Although in the illustrated embodiment the sleeve halves 52a, 52b are shown as being semi-annular, it will be appreciated by those skilled in the art that other configurations are possible. Alternatively, the connecting sleeve 52 may be formed with an axial slit (not shown). The connecting sleeve 52 consists of side elements 62 connected by a bridge 63, as shown in FIG. 13. The bridge 63 has an elongated opening 64 formed therein such that each of the sleeve halves 52a, 52b has a substantially u-shaped cross-section. Each of the side elements 62 has a smaller diameter than the bridge 63. A groove 65 is formed between the bridge 63 and each of the side elements 62. A plurality of internal sleeve engaging elements 66 that correspond to the hub engaging elements 57 extend in a radial direction from an internal surface of each of the side elements 62. The internal sleeve engaging elements 66 may, for example, be formed as teeth. A plurality of external sleeve engaging elements 67 that correspond to the second hub engaging elements 59 extend in a radial direction from an external surface of each of the side elements 62. The external sleeve engaging elements 67 may, for example, be formed as teeth. The external sleeve engaging elements 26 have a width 68, as shown in FIG. 12. The internal sleeve engaging elements 66 and the external sleeve engaging elements 67 and the hub engaging elements 57 and the second hub engaging elements 59, respectively, may fit together, for example, with an interference fit or such that a slight amount of clearance is left there between. The connecting sleeve 52 may be formed, for example, from an elastomeric material, such as a neoprene rubber, a polyurethane, a urethane blend, a thermoplastic material, ethylene-propylene-diene-monomer (EPDM), or any other suitable flexible material. It will be appreciated by those skilled in the art that the connecting sleeve 52 is not limited to the configuration described herein and that other configurations of the connecting element are possible within the scope and spirit of the invention.

As shown in FIGS. 9 and 12 each of the retainers 53 has a substantially annular configuration and is separable into separate retainer halves 53a, 53b. Although in the illustrated embodiment the retainer halves 53a, 53b are shown as being semi-annular, it will be appreciated by those skilled in the art that other configurations are possible. As shown in FIG. 12, each of the retainers 53 consists of an internal flange 69 and a collar 71. The internal flange 69 extends substantially perpendicular to the collar 71. Each of the retainers 53 is provided with attachment member receiving through-holes 70 that correspond to the attachment member receiving through-holes 60 of the hubs 51. The attachment member receiving through-holes 70 may be threaded for receipt of the attachment members 61. It will be appreciated by those skilled in the art, however, that other conventional attachment members and/or methods of attachment may be used, such as retaining clips, clamping rings, etc. The retainers 53 may be formed, for example, from a metal or plastic material.

As shown in FIG. 13, each of the hubs 51 is secured to a rotatable shaft 72. Each of the rotatable shafts 72 may be formed to have a shaft keyway (not shown) that corresponds to the hub keyway (not shown) in the hubs 51. A key (not shown) may be received in the shaft keyway (not shown) and the hub keyway (not shown) so that the hub 51 is secured to the rotatable shaft 72 during rotation. The rotatable shafts 72 are secured such that a space 73 is left there between. It will be appreciated by those skilled in the art that attachment of the rotatable shafts 72 to the hubs 51 is not limited to the method described herein and that other methods of attachment are possible within the scope and spirit of the invention.

The sleeve halves 52a, 52b of the connecting sleeve 52 are received in the connecting sleeve receiving openings 58 of the hubs 51. The internal sleeve engaging elements 66 mate with the hub engaging elements 57 and the external sleeve engaging elements 67 mate with the second hub engaging elements 59, as shown in FIG. 10. The retainer halves 53a, 53b of the retainers 53 are positioned on the hubs 51 such that the collar 71 is positioned adjacent to an outer periphery of the outer extension 56, and the internal flange 69 is received in the groove 65 between the bridge 63 and the side element 62 so that the internal flanges 69 engage the connecting sleeve 52, as shown in FIG. 13. The attachment members 61 are inserted into the attachment member receiving through-holes 70 of the retainers 53 and the attachment member receiving through-holes 60 of the hubs 51 to secure the retainers 53 and thus the connecting sleeve 52 to the hubs 51.

To replace the connecting sleeve 52, the retainer halves 53a, 53b of the retainers 53 are removed from the hubs 51 by removing the attachment members 61. The hubs 51 are moved away from each other down the length of the shaft 72. The sleeve halves 52a, 52b of the connecting sleeve 52 are then removed from the hubs 51. A new connecting sleeve 52 is re-positioned on each of the hubs 51 in the connecting sleeve receiving openings 58. The hubs 51 are moved toward each other down the length of the shaft 72 to re-position the hubs 51 proximate to each other. The retainer halves 53a, 53b of the retainers 53 are then re-positioned on the hubs 51 such that the internal flanges 69 engage the connecting sleeve 52. The retainer halves 53a, 53b are re-attached to the hubs 51 by the attachment members 61.

Each of the retainers 53 in the flexible coupling device 50 is provided with the internal flange 69 that engages the external sleeve engaging elements 67 of the connecting sleeve 52. The internal flange 69 thereby restricts the axial movement of the connecting sleeve 52 relative to the hubs 51 and the retainers 53 by effectively clamping the connecting sleeve 52 between the hub 51 and the internal flange 69. By restricting the movement of the connecting sleeve 52 relative to the hubs 51 and the retainers 53, excess wear due to misalignment and light torque loads is reduced and/or eliminated.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A flexible coupling device for mounting on axially opposed rotatable shafts rotatable about an axis of rotation, comprising:
   a pair of opposing hubs, each of the hubs having a plurality of hub engaging elements extending radially outwardly there from relative to the axis of rotation;
   a flexible connecting sleeve having a plurality of internal sleeve engaging elements extending radially inwardly there from relative to the axis of rotation that mate with the hub engaging elements and a plurality of external sleeve engaging elements extending radially outwardly there from relative to the axis of rotation; and
   a pair of opposing retainers, each of the retainers having
      a collar disposed radially outwardly of a corresponding hub; and,
      an internal flange extending radially inwardly relative to the axis of rotation that restricts movement of the flexible connecting sleeve relative to the hubs and the retainers
      wherein the plurality of hub engaging elements, the plurality of internal sleeve engagement elements and the plurality of external sleeve engaging elements are formed as teeth.

2. The flexible coupling device of claim 1, wherein each of the retainers has an external flange extending radially inwardly therefrom relative to the axis of rotation and the internal and external flanges are spaced apart by a width approximately the same as a width of the external sleeve engaging elements such that axial movement of the external sleeve engaging elements is limited.

3. The flexible coupling device of claim 1, wherein each of the hubs has an inner extension with a smaller diameter than a diameter of the remainder of the hubs and the hub engaging elements are formed on the inner extensions.

4. The flexible coupling device of claim 1, wherein the internal sleeve engaging elements and the hub engaging elements fit together in a line-to-line fit to restrict axial movement of the flexible connecting sleeve relative to the hubs.

5. The flexible coupling device of claim 1 wherein the retainers are removably attached to the hubs by attachment members extending through aligned through-holes in the retainers and the hubs.

6. The flexible coupling device of claim 5, wherein each collar extends axially and is attached to the corresponding hub by the attachment members.

7. The flexible coupling device of claim 5 wherein the attachment members are inserted radially relative to the axis of rotation.

8. The flexible coupling device of claim 5 wherein the attachment members are inserted axially relative to the axis of rotation.

9. The flexible coupling device of claim 1 wherein each of the retainers has a plurality of retainer engaging elements extending radially inwardly there from relative to the axis of rotation that mate with the external sleeve engaging elements of a corresponding hub.

10. The flexible coupling device of claim 1, wherein the flexible connecting sleeve includes side elements connected by a bridge, the external and internal sleeve engaging elements extending from the side elements, the internal flange of each retainer being positioned between a corresponding side element and the bridge.

11. The flexible coupling device of claim 1 wherein the hub includes second hub engaging elements that mate with the external sleeve engaging elements.

12. The flexible coupling device of claim 1 wherein each of the retainers includes at least one radially inwardly projecting alignment dowel configured to be received within a corresponding aperture in a corresponding hub.

13. A flexible coupling device for mounting on axially opposed rotatable shafts rotatable about an axis of rotation, comprising:
   a pair of opposing hubs, each of the hubs having a plurality of hub engaging elements extending radially outwardly there from relative to the axis of rotation;
   a flexible connecting sleeve having a plurality of internal sleeve engaging elements extending radially inwardly there from relative to the axis of rotation that mate with the hub engaging elements and a plurality of external sleeve engaging elements extending radially outwardly there from relative to the axis of rotation;
   a pair of opposing retainers, each of the retainers having
      a collar disposed radially outwardly of a corresponding hub; and, an internal flange extending radially inwardly relative to the axis of rotation that restricts movement of the flexible connecting sleeve relative to the hubs and the retainers;

wherein each of the hubs has an inner extension with a smaller diameter than a diameter of the remainder of the hubs and the hub engaging elements are formed on the inner extensions.

14. The flexible coupling device of claim 13, wherein each of the retainers has an external flange extending radially inwardly therefrom relative to the axis of rotation and the internal and external flanges are spaced apart by a width approximately the same as a width of the external sleeve engaging elements such that axial movement of the external sleeve engaging elements is limited.

15. The flexible coupling device of claim 13, wherein the internal sleeve engaging elements and the hub engaging elements fit together in a line-to-line fit to restrict axial movement of the flexible connecting sleeve relative to the hubs.

16. The flexible coupling device of claim 15 wherein the internal sleeve engaging elements and the hub engaging elements fit together in an interference fit.

17. The flexible coupling device of claim 4 wherein the internal sleeve engaging elements and the hub engaging elements fit together in an interference fit.

18. The flexible coupling device of claim 17, wherein each collar extends axially and is attached to the corresponding hub by the attachment members.

19. The flexible coupling device of claim 13 wherein the retainers are removably attached to the hubs by attachment members extending through aligned through-holes in the retainers and the hubs.

20. The flexible coupling device of claim 19 wherein the attachment members are inserted axially relative to the axis of rotation.

21. The flexible coupling device of claim 19 wherein the attachment members are inserted radially relative to the axis of rotation.

22. The flexible coupling device of claim 13 wherein each of the retainers has a plurality of retainer engaging elements extending radially inwardly there from relative to the axis of rotation that mate with the external sleeve engaging elements of a corresponding hub.

23. The flexible coupling device of claim 13, wherein the flexible connecting sleeve includes side elements connected by a bridge, the external and internal sleeve engaging elements extending from the side elements, the internal flange of each retainer being positioned between a corresponding side element and the bridge.

24. The flexible coupling device of claim 13 wherein the hub includes second hub engaging elements that mate with the external sleeve engaging elements.

25. The flexible coupling device of claim 13 wherein each of the retainers includes at least one radially inwardly projecting alignment dowel configured to be received within a corresponding aperture in a corresponding hub.

26. A flexible coupling device for mounting on axially opposed rotatable shafts rotatable about an axis of rotation, comprising:

a pair of opposing hubs, each of the hubs having a plurality of hub engaging elements extending radially outwardly there from relative to the axis of rotation;

a flexible connecting sleeve having a plurality of internal sleeve engaging elements extending radially inwardly there from relative to the axis of rotation that mate with the hub engaging elements and a plurality of external sleeve engaging elements extending radially outwardly there from relative to the axis of rotation; and a pair of opposing retainers removably attached to the hubs by attachment members extending through aligned through-holes in the retainers and the hubs, each of the retainers having a collar disposed radially outwardly of a corresponding hub; and, an internal flange extending radially inwardly relative to the axis of rotation that restricts movement of the flexible connecting sleeve relative to the hubs and the retainers.

27. The flexible coupling device of claim 26, wherein each collar extend axially and is attached to the corresponding hub by the attachment members.

28. The flexible coupling device of claim 26, wherein the flexible connecting sleeve includes side elements connected by a bridge, the external and internal sleeve engaging elements extending from the side elements, the internal flange of each retainer being positioned between a corresponding side element and the bridge.

29. The flexible coupling device of claim 26, wherein the hub includes second hub engaging elements that mate with the external sleeve engaging elements.

30. The flexible coupling device of claim 26, wherein the internal sleeve engaging elements and the hub engaging elements fit together in a line-to-line fit to restrict axial movement of the flexible connecting sleeve relative to the hubs.

31. The flexible coupling device of claim 30 wherein the internal sleeve engaging elements and the hub engaging elements fit together in an interference fit.

32. The flexible coupling device of claim 26, wherein each of the retainers has an external flange extending radially inwardly therefrom relative to the axis of rotation and the internal and external flanges are spaced apart by a width approximately the same as a width of the external sleeve engaging elements such that axial movement of the external sleeve engaging elements is limited.

33. The flexible coupling device of claim 26 wherein each of the retainers has a plurality of retainer engaging elements extending radially inwardly there from relative to the axis of rotation that mate with the external sleeve engaging elements of a corresponding hub.

34. The flexible coupling device of claim 26 wherein the attachment members are inserted radially relative to the axis of rotation.

35. The flexible coupling device of claim 26 wherein the attachment members are inserted axially relative to the axis of rotation.

36. The flexible coupling device of claim 26 wherein each of the retainers includes at least one radially inwardly projecting alignment dowel configured to be received within a corresponding aperture in a corresponding hub.

* * * * *